United States Patent Office 3,439,973
Patented Apr. 22, 1969

3,439,973
POLARIZING REFLECTOR FOR ELECTROMAGNETIC WAVE RADIATION IN THE MICRON WAVELENGTH
Bernt Paul, Erlangen, and Herbert Weiss and Manfred Wilhelm, Nuremberg, Germany, assignors to Siemens Aktiengesellschaft, Erlangen, Germany, a corporation of Germany
Filed June 25, 1964, Ser. No. 378,025
Claims priority, application Germany, Apr. 15, 1964, S 90,548
Int. Cl. G02b 5/30, 27/28, 5/20
U.S. Cl. 350—147                                      5 Claims

ABSTRACT OF THE DISCLOSURE

A polarizing reflector for electromagnetic wave radiation comprises a carrier structure of poorly conducting material forming a reflector surface for the radiation. A multitude of elongated radiation dipoles having respective lengths in the order of magnitude of the wavelengths to be reflected are dispersed and embedded in the carrier material. The dipoles are in parallel relation to each other and to the reflector surface and have a mutual maximum spacing in the order of wavelength magnitude.

---

Our invention relates to dipole devices for polarizing reflection of electromagnetic radiation below 1 mm. wavelength, preferably in the infrared and near-infrared range of the spectrum, and is based upon the discovery disclosed in United States Patent No. 3,226,225, issued Dec. 28, 1965. The present invention is also related to the copending application Ser. No. 377,800 of H. Weiss entitled Dipole Device for Electromagnetic Wave Radiation in Micron Wave-Length Ranges, and Method of its Manufacture, filed concurrently herewith.

The present invention has for its object to provide polarizing reflectors which afford an efficient performance at various wavelengths for which conventional reflectors are less suitable, such as for use in the above-mentioned frequency range.

According to the invention, a polarizing reflector for wavelengths below 1 mm., particularly for the micron wave range, consists of a solid carrier structure formed of poorly conducting material and having a reflector surface for the radiation, and a multitude of elongated radiation dipoles whose respective lengths are in the order of magnitude of the wavelengths to be reflected, the dipoles being dispersed and embedded in the carrier material in parallel relation to the reflector surface and having a mutual maximal spacing in the order of magnitude of, or smaller than, the wavelength which the radiation to be reflected possesses in the carrier substance.

It will be noted that the permissible lateral maximum spacing of the elongated dipoles in the carrier material relates to the wavelength in the carrier material which differs from the wavelength of the same radiation in air. For example, infrared light in air has a wavelength of $16\mu$ but a wavelength of about $4\mu$ in indium antimonide.

Carrier materials and dipole substances for the purposes of the invention, as well as the methods for their production, may correspond to those described for the production of electronic semiconductor devices in the aforementioned Patent No. 3,226,225 assigned to the assignee of the present invention.

Accordingly, the carrier substance preferably consists of an electrically semiconducting material such as indium antimonide (InSb) with segregated needle-shaped inclusions of nickel antimonide (NiSb) or manganese antimonide (MnSb). The carrier material such as InSb, and the added substance such as NiSb are melted together and the homogeneous melt is then permitted to freeze. During freezing the segregating inclusions are subjected to an orienting effect. The desired parallel orientation of the inclusions is obtained, for example, by subjecting the melt to normal freezing, i.e. gradual solidification from one end of the melt to the other, or to zone melting of the solidified ingot, although an orienting electric or magnetic field can also be used for this purpose. Preferably employed is a eutectic mixture of the carrier material and the inclusion material, the latter being soluble in the carrier material in the molten state but not in the solid state so that it will segregate out during freezing. In a eutectic melt of InSb and NiSb, for example, the quantity of NiSb is about 1.8% by weight.

Also applicable are other semiconductor materials such as gallium antimonide or germanium, although for the purposes of the present invention, we have found it preferable to employ InSb as carrier material. When using antimonides as carrier material, the required rod- or needle-shaped dipoles in form of segregated inclusions can be formed of Sb, $CrSb_2$, MnSb, NiSb or $FeSb_2$, for example. When using Ge as carrier material, the dipoles can be formed by an addition of Ni or Co. In each case a stoichiometric composition of the melt can be employed for obtaining the desired rod shape of the inclusions.

Depending upon the production and the material of a reflector device according to the invention, the reflected light is polarized for given frequency ranges of larger or smaller band width. For that reason, such a reflector device is well suitable, for example, as reflector structure in light amplifiers such as lasers.

According to another feature of our invention, we have found it particularly advantageous to employ InSb as carrier material and manganese antimonide (MnSb) as material for the oriented dipoles. MnSb is ferromagnetic. A structure consisting of crystalline InSb with embedded needle-shaped inclusions of segregated MnSb is not well suitable as a filter, but it results in excellent metallic reflectivity and polarization. The substantially eutectic melt used for producing such a device contains approximately 6% by weight of MnSb. It exhibits a metallic reflectivity and a polarization for light having wavelengths between $10\mu$ and $25\mu$, the reflectivity increasing toward the longer wavelengths.

The following production example corresponds to those disclosed in the aforementioned Patent No. 3,226,225.

326 g. of InSb are melted together with 15.8 g. of $Mn_2Sb$ and 9.3 g. of Sb, the total amount of Mn and Sb corresponding to 6.9% by weight of MnSb relative to the amount of InSb. This composition forms a eutectic melt. The melting is performed in a carburized quartz boat and kept molten at 700° C. for about one hour in an atmosphere of argon. The homogeneous melt is then slowly pulled out of the hot furnace at a rate of about 0.6 mm./min. to permit normal freezing. The resulting inclusions of MnSb crystallize in needle-shaped configuration and are parallel to the pulling direction. Thin slices are then cut from the solidified ingot and one of their planar surfaces parallel to the orienting direction of the dipole inclusions is ground and polished to serve as reflection surface.

The penetration of the radiation to be reflected is extremely shallow. Hence, the resulting reflector structures proper can be kept extremely thin, for example in the order of 20 to $70\mu$. Small reflector having, for example, a surface area of about 10 mm.$^2$, are self-supporting at a thickness of about 60 microns or more. However, they are rather brittle. It is preferable therefore to cement them to reinforcing plates of any suitable material such as sheet metal or preferably to a thicker slab of crystalline semiconductor material such as silicon, or to glass or sintered ceramics such as sintered alumina, the latter substances having about the same thermal coefficient of expansion as the dipole reflector structure. Thus reinforced, the reflective, optical surface can be more readily and more accurately subjected to the desired polishing operation.

A reflector according to the invention is illustrated by way of example in the accompanying drawings, in which.

Figure 1:
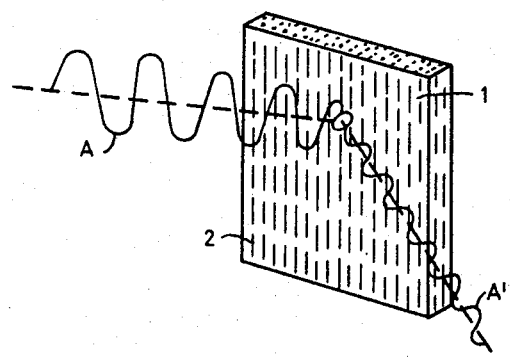
FIGS. 1 and 2 are explanatory and show a planar reflector structure in two different positions, respectively, and in relation to an incident and reflected wave of radiation.

As shown in FIG. 1, the dipoles 2 distributed and embedded in the carrier material 1, such as the above-mentioned MnSb needle segregations in a crystalline plate of InSb, are all oriented in the same direction. A light wave A whose electrical vector oscillates in a plane parallel to the orientation of the dipoles 2 is substantially absorbed in the structure 1 so that the reflected wave A' issuing from the point of incidence has a greatly attenuated amplitude.

Figure 2:
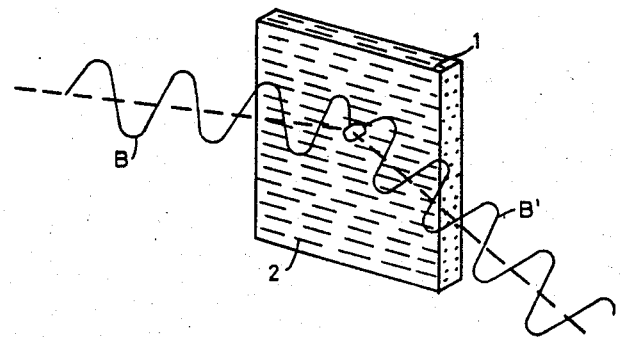

In contrast thereto, when the incident wave B according to FIG. 2 has its electrical vector oscillating in a plane perpendicular to the orientation of the dipoles, substantially the entire wave is reflected so that the reflected wave B' has the same amplitude as the incident wave.

Figure 3:
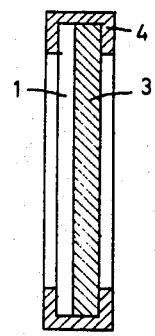
FIG. 3 shows in cross section an infrared filter assembly comprising a filter structure as shown in FIGS. 1 and 2.

In the filter assembly shown in FIG. 3, a substantially square filter plate 1 corresponding to those shown in FIGS. 1 and 2 is cemented onto a reinforcing plate 3 of silicon and both are held in a frame 4 of metal.

Figure 4:
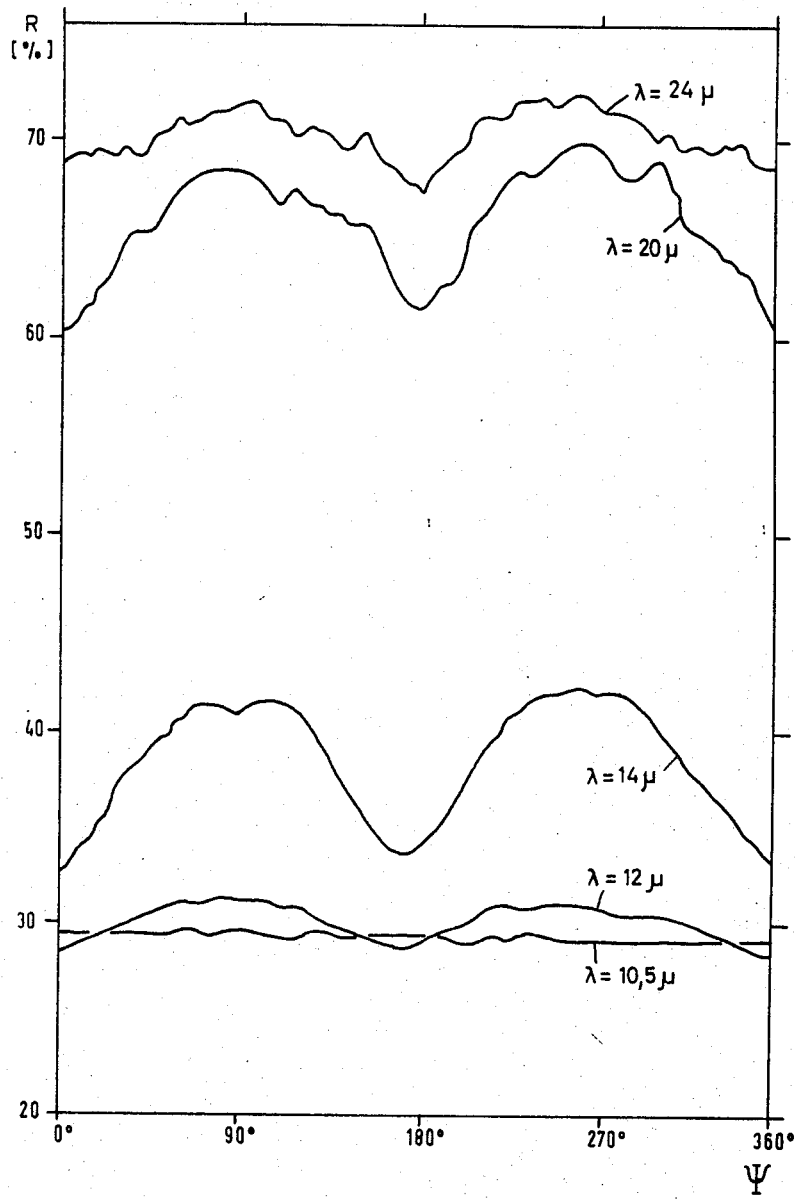
FIG. 4 is a graph of measured reflection values relating to a filter according to the invention made in the above-described manner from a carrier material of InSb with oriented dipole inclusions of MmSb.

The graph in FIG. 4, relating to the reflectivity of the above-described InSb-MnSb dipole filter indicates the reflectivity in percent on the ordinate and the azimuth $\Psi$ of the polarization plane on the abscissa. The reflectivity R is defined as the ratio of the reflected intensity to the intensity of the incident radiation. The azimuth $\Psi$ is defined as the angle between the polarization plane (plane of the magnetic vector) of the reflected electromagnetic radiation and the direction of the parallel MnSb dipoles. The graph shows the reflectivity curves for the respective wavelengths $\lambda 10.5$, 12, 14, 20 and $24\mu$. These wavelengths are in the infrared portion of the spectrum.

The graph shows that the reflected light is polarized and also that the median reflectivity increases with the wavelength of the incident light. This dependence of reflectivity upon wavelength, in InSb-MnSb devices, is similar to that of metals, at least above a wavelength of about $14\mu$.

We claim:

1. A polarizing reflector for electromagnetic wave radiation in micron wavelengths, comprising a carrier structure of poorly conducting material forming a reflector surface for the radiation, and a multitude of elongated radiation dipoles having respective lengths in the order of magnitude of the wavelengths to be reflected, said dipoles being dispersed and embedded in said carrier material in parallel relation to each other and to said reflector surface and having a mutual maximum spacing in the order of wavelength magnitude.

2. In a reflector device according to claim 1, said material of said carrier structure consisting of semiconductor material, and said dipoles consisting of needle-shaped segregations of material insoluble in said semiconductor material in the solid state and forming therewith a eutectic when molten.

3. In a reflector device according to claim 1, said material of said carrier structure consisting of an $A^{III}B^V$ semiconductor compound transparent to the wavelength to be reflected, and said dipoles consisting of needle-shaped segregations of wave-conducting material insoluble in said compound in the solid state.

4. In a reflector device according to claim 1, said material of said carrier structure consisting of indium antimonide, and said dipoles consisting of needle-shaped segregations of manganese antimonide.

5. In a reflector device according to claim 1, said material of said carrier structure consisting of indium antimonide, and said dipoles consisting of needle-shaped segregations of manganese antimonide, said manganese antimonide amounting to about 6% by weight of said indium antimonide, and the device having polarized reflectivity for wavelengths between about 10 and about 25 microns.

References Cited

UNITED STATES PATENTS

| 2,643,336 | 6/1953 | Valensi | 350—147 XR |
| 2,788,440 | 4/1957 | Ramsay et al. | 350—152 XR |
| 2,987,959 | 6/1961 | Kimmel. | |
| 2,992,425 | 7/1961 | Pratt | 350—147 XR |
| 3,226,225 | 12/1965 | Weiss et al. | 252—62.3 XR |

DAVID SCHONBERG, *Primary Examiner.*

P. R. MILLER, *Assistant Examiner.*

U.S. Cl. X.R.

350—152, 320